United States Patent [19]
Philippe et al.

[11] Patent Number: 5,607,657
[45] Date of Patent: Mar. 4, 1997

[54] REMOVAL OF SULFUR COMPOUNDS IN CLAUS TYPE RESIDUAL GASES WITH SULFUR RECOVERY

[75] Inventors: André Philippe, Orthez; Jean Nougayrede, Pau; Georges Kvasnikoff, Monein, all of France

[73] Assignee: Elf Aquitaine Production, Paris La Defense, France

[21] Appl. No.: 341,605

[22] PCT Filed: Mar. 16, 1994

[86] PCT No.: PCT/FR94/00284

§ 371 Date: Feb. 14, 1995

§ 102(e) Date: Feb. 14, 1995

[87] PCT Pub. No.: WO94/21359

PCT Pub. Date: Sep. 29, 1994

[30] Foreign Application Priority Data

Mar. 16, 1993 [FR] France ................. 93 02995

[51] Int. Cl.⁶ .................................. C01B 17/02
[52] U.S. Cl. ................... 423/576.2; 423/576.8; 423/574.1
[58] Field of Search .................. 423/576, 576.2, 423/573.1, 574.1, 576.8

[56] References Cited

U.S. PATENT DOCUMENTS

| | | | |
|---|---|---|---|
| 4,430,317 | 2/1984 | Reed et al. | 423/576 |
| 4,507,275 | 3/1985 | Reed | 423/576 |
| 4,508,699 | 4/1985 | Schoofs | 423/576 |
| 4,533,529 | 8/1985 | Lee | 423/576 |
| 5,202,107 | 4/1993 | Kvasnikoff et al. | 423/576 |

FOREIGN PATENT DOCUMENTS

| | | |
|---|---|---|
| 514688 | 7/1955 | Canada ............. 423/516.2 |
| 412500 | 12/1989 | European Pat. Off. . |
| 346218 | 12/1989 | European Pat. Off. . |
| 421500 | 8/1990 | European Pat. Off. . |
| 345862 | 4/1991 | European Pat. Off. . |

Primary Examiner—Gary P. Straub
Attorney, Agent, or Firm—Weiser & Associates, P.C.

[57] ABSTRACT

A process is disclosed for the removal of sulphur compounds from a residual gas so as to obtain a purified gas stream substantially free of sulphur compounds, which process comprises subjecting the residual gas to a combined hydrogenation and hydrolysis, cooling the gas to a temperature whereby water vapor in the gas is not condensed, mixing the gaseous effluent with a gas containing free oxygen, contacting the cooled gaseous effluent and the gas containing free oxygen with a catalyst for selective oxidation of $H_2S$ to sulphur, and depositing substantially all of the sulphur formed on the catalyst.

41 Claims, 1 Drawing Sheet

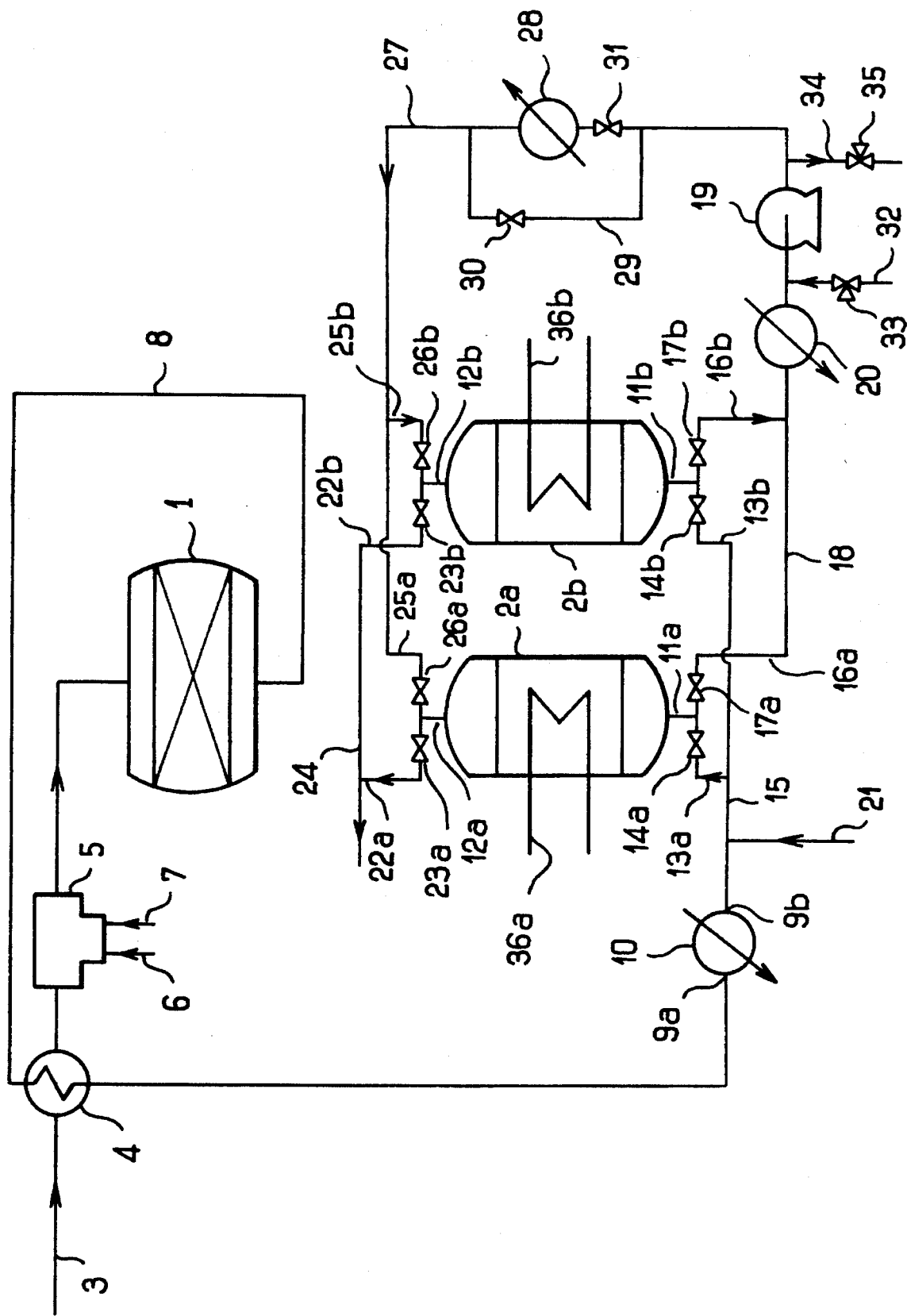

REMOVAL OF SULFUR COMPOUNDS IN CLAUS TYPE RESIDUAL GASES WITH SULFUR RECOVERY

The invention relates to a process for the removal of the sulphur compounds present in a residual gas of the type of Claus sulphur plant residual gas, with recovery of the said compounds in the form of sulphur.

BACKGROUND OF THE INVENTION

Residual gases originating from a sulphur plant in which sulphur is produced by the process of controlled oxidation of sour gas containing $H_2S$, known as the Claus process, contain of the order of 0.2 to 2% by volume of sulphur compounds, a high proportion of which consists of $H_2S$, the remainder consisting of $SO_2$, COS, $CS_2$ and sulphur in vapour and/or vesicular form.

Such residual gases are commonly treated to reduce the overall content of sulphur compounds as much as possible with the aim Of allowing them to be discharged to the atmosphere, after they have been burnt, while conforming to the standards imposed by legislation relating to atmospheric pollution and simultaneously of recovering these sulphur compounds in a form contributing to increasing the yield of upgradable products produced from the sour gas treated in the sulphur plant.

Various processes for performing the treatment of a Claus sulphur plant residual gas are known, and especially processes comprising a combined treatment of hydrogenation and hydrolysis of the residual gas with a view to converting the sulphur compounds which it contains solely into the form of $H_2S$, followed by a cooling of the effluent resulting from the said combined treatment to temperature which is appropriate for condensing most of the water vapour present in this effluent and, finally, a treatment of the gaseous effluent depleted in water vapour to remove the $H_2S$ therefrom, it being possible for this removal of $H_2S$ to be carried out either by absorption of $H_2S$ by means of a selective solvent which can be regenerated or else by controlled catalytic oxidation of $H_2S$.

Among the processes of the abovementioned type, comprising a removal of $H_2S$ by catalytic oxidation to sulphur, there features a process in which, after the combined treatment of hydrogenation and hydrolysis of the Claus residual gas and cooling of the resulting gaseous effluent in order to condense most of the water in it, the effluent depleted in water vapour is passed with a controlled quantity of a gas containing free oxygen, at an appropriate temperature, in contact with a catalyst for $H_2S$ oxidation to form a gas stream containing $H_2S$ and $SO_2$ in a $H_2S:SO_2$ molar ratio substantially equal to 2:1 together with elemental sulphur in vapour phase, and the said gas stream is then brought, after cooling below 160° C. and optional separation from the sulphur which it contains, into contact with a Claus catalyst operating at a sufficiently low temperature for the sulphur formed by reaction of $H_2S$ with $SO_2$ to be retained on the catalyst with production of a residual gas effluent with a greatly reduced content of sulphur compounds which is subjected to burning before discharge to the atmosphere, and the sulphur-laden Claus catalyst is purged at regular intervals with the aid of a nonoxidizing gas at a temperature of between 200° C. and 500° C. to vaporize the sulphur retained by this catalyst and thus to ensure the regeneration of the latter, and the regenerated catalyst is then cooled to the temperature required for being again brought into contact with the gas containing $H_2S$ and $SO_2$, that is to say with the gas stream produced by the oxidation.

In such a process the cooling of the gaseous effluent resulting from the combined treatment of hydrogenation and hydrolysis applied to the residual gas is conducted so as to bring the water vapour content of the cooled gaseous effluent to a value lower than approximately 10% by volume, and this results in the production of a large quantity of residual water contaminated with $H_2S$, which must be treated to remove $H_2S$ therefrom. In addition, although the control of the quantity of gas containing free oxygen, employed in the stage of catalytic oxidation of $H_2S$ in Claus stoichiometry, may be efficient, it remains possible for unconverted oxygen to be entrained in the gas stream containing $H_2S$ and $SO_2$ produced by the catalytic oxidation, which is brought into contact with the Claus catalyst, the result being a risk of deactivation of the said Claus catalyst. Finally, since the ultimate stage of removal of the sulphur compounds is the Claus reaction, the quality of the purification carried out is therefore dependent on the quality of the control of the flow of air injected into the oxidation reactor.

SUMMARY OF THE INVENTION

The subject of the invention is a process for the removal of the sulphur compounds present in a residual gas of the type of Claus sulphur plant residual gas with recovery of the said compounds in the form of sulphur, which does not comprise either any water condensation stage or the stage of Claus reaction between $H_2S$ and $SO_2$ of the abovementioned process and which therefore makes it possible to remove the abovementioned disadvantages.

The process according to the invention is of the type in which the residual gas is subjected to a combined treatment of hydrogenation and hydrolysis to convert the sulphur compounds which it contains solely into the form of $H_2S$ and the resulting gaseous effluent containing $H_2S$ is passed, at the appropriate temperature, with a gas containing free oxygen in a quantity capable of providing an $O_2:H_2S$ molar ratio ranging from 0.5 to 3 and preferably from 0.5 to 1.5, in contact with a catalyst for oxidizing $H_2S$ to sulphur, and it is characterized in that the gaseous effluent produced by the combined treatment of hydrogenation and hydrolysis is cooled to a temperature of between the dew point $\theta$ of the water in the said gaseous effluent and 180° C. and the contact of the cooled gaseous effluent and of the gas containing free oxygen with a catalyst promoting the selective oxidation of $H_2S$ to sulphur is brought about by operating at temperatures which are maintained, throughout the period of the said contact, at values taken between $\theta$ and 180° C. in order to oxidize substantially quantitatively to sulphur the $H_2S$ present in the said gaseous effluent and to deposit virtually all of the sulphur formed on the catalyst and to obtain a purified gas stream practically free from $H_2S$.

When the reaction of catalytic oxidation of $H_2S$ to sulphur is carried out in the temperature range according to the invention the $H_2S$ is oxidized selectively to sulphur without any formation of $SO_2$ even in the presence of an excess of oxygen.

In other words, in the process according to the invention it is possible to work with a large excess of oxygen in relation to the stoichiometry of the reaction $H_2S+\frac{1}{2}O_2 \rightarrow H_2O+S$, while maintaining a virtually quantitative conversion of $H_2S$ and an excellent selectivity for sulphur, and this makes it possible to obtain a sulphur yield which is practically independent of the quality of the control of the oxygen flow rate over the oxidation catalyst.

During the combined stage of hydrogenation and hydrolysis, which is usually performed in the presence of a catalyst, sulphur compounds such as $SO_2$, $CS_2$, COS and the sulphur in vapour and/or vesicular form, which are present in the residual gas, are converted into $H_2S$ either by the action of hydrogen, in the case of $SO_2$ and of sulphur in vapour and/or vesicular form, or by hydrolysis, in the case of COS and $CS_2$, by the action of the water vapour present in the said residual gas. The combined hydrogenation and hydrolysis treatment is carried out at temperatures which can range approximately from 140° C. to 550° C. and preferably lie approximately between 200° C. and 400° C. The hydrogen needed for the hydrogenation reaction may be already present in the residual gas or may be formed in situ in the hydrogenation and hydrolysis zone, for example by reaction of CO with $H_2O$ when the residual gas contains these two reactants, or else may be added to the residual gas from an external source of hydrogen. A convenient way of supplying $H_2$ and CO to the residual gas consists in adding to the said residual gas the combustion gases produced by a fuel gas burner operating below stoichiometry. The quantity of hydrogen to be employed must be sufficient to obtain a practically complete conversion into $H_2S$ of the hydrogenable sulphur compounds or products such as $SO_2$ and sulphur in the vapour and/or vesicular form, which are present in the residual gas subjected to the hydrogenation and hydrolysis treatment. In practice, the hydrogen quantity employed may range from 1 to 6 times the stoichiometric quantity required for converting into $H_2S$ the hydrogenable sulphur products present in the residual gas.

If the residual gas does not contain sufficient water vapour for the hydrolysis of the organic sulphur compounds COS and $CS_2$, the required quantity of water vapour may be added to it before the combined hydrogenation and hydrolysis treatment is performed.

Catalysts which can be employed for the hydrogenation and hydrolysis treatment are those containing compounds of metals of groups Va, VIa and VIII of the Periodic Classification of the elements, for example compounds of metals such as cobalt, molybdenum, chromium, vanadium, thorium, nickel, tungsten or uranium, the said compounds being optionally deposited on a support of the silica, alumina or silica/alumina type. Hydrodesulphurization catalysts based on cobalt and molybdenum oxides deposited on alumina are particularly effective for the hydrogenation and hydrolysis treatment. In the case of this hydrogenation and hydrolysis treatment the contact times between the gaseous reaction mixture and the catalyst may vary quite widely. They are advantageously between 0.5 and 8 seconds and more particularly between 1 and 5 seconds, these values being given in the standard pressure and temperature conditions.

The gaseous effluent resulting from the combined hydrogenation and hydrolysis treatment of the residual gas is subjected to cooling carried out by using any known technique and, for example, to an indirect heat exchange with a colder fluid, to bring its temperature into the range θ to 180° C. θ being as already indicated, the dew point of the water in the said gaseous effluent.

The gaseous effluent cooled to the temperature in the range θ to 180° C. has then added to it the required quantity of the gas containing free oxygen, it being possible for this addition to be carried out either while the said cooled gaseous effluent is being brought into contact with the catalyst for oxidation of $H_2S$ to sulphur or, preferably, before the said contact is brought about, in order to obtain a very homogeneous reaction mixture during the contact with the said catalyst.

The gas containing free oxygen employed for oxidizing to sulphur the $H_2S$ present in the gas to be treated is generally air, although it is possible to employ pure oxygen, oxygen-enriched air or else mixtures, in various proportions, of oxygen and of an inert gas other than nitrogen.

As indicated earlier, the gas containing free oxygen is employed in a quantity such as to provide an $O_2:H_2S$ molar ratio ranging from 0.5 to 3 and more particularly from 0.5 to 1.5 in the reaction mixture arriving into contact with the catalyst for oxidizing $H_2S$ to sulphur.

The contact times of the gaseous reaction mixture with the oxidation catalyst may range from 0.5 of a second to 20 seconds and preferably from 1 second to 15 seconds, these values being given in the standard pressure and temperature conditions.

The oxidation catalyst may be chosen from the various catalysts capable of promoting the selective oxidation of $H_2S$ to sulphur by oxygen, that is to say of promoting the reaction $H_2S+\frac{1}{2} O_2 \rightarrow S+H_2O$, at temperatures below the dew point of the sulphur formed, which sulphur is then deposited on the catalyst.

In particular, the oxidation catalyst may be formed by an active phase consisting of one or more oxides and/or salts of one or more transition metals such as nickel, cobalt, iron, copper, silver, manganese, molybdenum, chromium, tungsten and vanadium, deposited on a support made of a refractory material such as, for example, bauxite, activated and/or stabilized alumina, titanium oxide, zirconiumoxide, zeolites, silica/alumina mixtures, silica/titanium oxide mixtures or silica, or else on a support made of active carbon.

The oxidation catalyst has a pore volume permitting a considerable sulphur load. The pore volume of the catalyst, determined by the mercury penetration method, advantageously represents 150 $cm^3$ to 600 $cm^3$ per liter of catalyst.

The active phase, expressed as weight of metal, in most cases represents 0.1 to 15% and preferably 0.2 to 7% of the weight of the oxidation catalyst.

To preserve the selectivity of the oxidation catalyst for oxidizing $H_2S$ to sulphur the said catalyst must be maintained at a temperature below 180° C. throughout the $H_2S$ oxidation stage. If the $H_2S$ concentration and/or the temperature, of between θ and 180° C., of the gaseous effluent containing $H_2S$ brought into contact with the oxidation catalyst are such that the temperature of the reaction mixture at the end of the oxidation is liable to exceed 180° C. because of the high exothermicity of the reaction $H_2S+\frac{1}{2} O_2 \rightarrow S+H_2O$, the heat released by the said reaction is removed by subjecting the catalyst to cooling by any known method. This cooling may be carried out, for example, with the aid of a cold fluid circulating in indirect heat exchange with the said catalyst within the latter. It is also possible to operate by placing the catalyst in a tubular reactor consisting of tubes arranged in a calandria with, for example, the catalyst present in the tubes and a cold fluid circulating between the tubes on the calandria side. The catalytic oxidation may also be performed in a reactor with a number of catalyst stages with cooling of the reaction mixture between the successive stages by indirect heat exchange with a cold fluid, the heat exchange taking place inside or outside the oxidation reactor.

The oxidation of $H_2S$ to sulphur in contact with the oxidation catalyst is advantageously carried out at temperatures ranging from 80° C. to 140° C. and more especially from 90° C. to 120° C.

If need be, the gas produced by bringing the gaseous effluent containing $H_2S$ and the gas containing free oxygen into contact with the oxidation catalyst may be subjected to a thermal or catalytic burning in order to convert into $SO_2$ the traces of $H_2S$ which it may still contain, before being discharged to the atmosphere.

During the oxidation of $H_2S$ to sulphur the oxidation catalyst becomes gradually laden with sulphur. The sulphur-laden catalyst is regenerated at regular intervals by being purged with the aid of a nonoxidizing gas, the operation being carried out at temperatures of between 200° C. and 500° C. and preferably between 250° C. and 450° C., to vaporize the sulphur retained on the catalyst and the regenerated catalyst is then cooled to a temperature of between 0 and 180° C. for a new application of the oxidation reaction, this cooling being carried out by means of an inert gas which is at an appropriate temperature below 180° C. The coolant gas may be optionally laden with water vapour, at least during the final stage of cooling of the catalyst.

The purging gas employed for regenerating the sulphur-laden oxidation catalyst may be such as methane, nitrogen, $CO_2$ or mixtures of such gases or may consist of a fraction of the gas stream originating from the oxidation stage and directed towards the burning or of a fraction of the residual gas to be treated. The purging gas employed for the above-mentioned regeneration may optionally contain a certain proportion of a gaseous reducing compound such as, for example, $H_2$, CO or $H_2S$, at least during the final stage of the regeneration, that is to say after the vaporization of most of the sulphur deposited on the oxidation catalyst, this being to reduce sulphates which might have been formed with some catalysts during the purification stage. Such a purging gas may consist, in particular, of a fraction of the sour gas treated in the sulphur plant from which the residual gas originates or else of a fraction of the gaseous effluent containing $H_2S$ resulting from the combined hydrogenation and hydrolysis treatment.

The application of the catalytic oxidation reaction according to the invention may be carried out in a single catalytic oxidation zone which operates alternately in an oxidation stage and in a regeneration/cooling stage. Such an application is adopted when the gas to be treated contains little $H_2S$ and when, consequently, the regeneration of the catalyst is infrequent. The application of the catalytic reaction according to the invention is advantageously carried out in a plurality of catalytic oxidation zones which operate so that at least one of the said zones operates in a regeneration/cooling stage while the other zones are in a catalytic oxidation stage. It is also possible to operate by having one or more zones in a catalytic oxidation reaction stage, at least one zone in a regeneration stage and at least one zone in a cooling stage.

The gas employed for regenerating the oxidation catalyst preferably circulates in a closed circuit starting from a heating zone, passing successively through the catalytic zone which is being regenerated and a cooling zone, in which most of the sulphur present in the said gas is separated by condensation, to return to the heating zone. The regenerating gas may, of course, also travel in an open circuit.

The gas employed for cooling the regenerated oxidation catalyst is of the same type as that employed for regenerating the sulphur-laden catalyst. The regeneration gas and coolant gas circuits may be independent from one another. However, according to one embodiment, the regeneration gas circuit, defined above, may also comprise a bypass connecting the exit of its cooling zone to the entry of the zone which is being regenerated while bypassing its heating zone, and this allows the said heating zone to be short-circuited and the regeneration gas thus to be employed as coolant gas.

The process according to the invention can be applied to the treatment of a residual gas of the type of Claus sulphur plant residual gas, that is to say a residual gas originating directly from a Claus sulphur plant or else of a residual gas originating from a purification unit, for example a unit of the Sulfreen unit type, treating a Claus sulphur plant residual gas by applying a process employing the Claus reaction.

The invention will be understood better on reading the description given below of one of its embodiments employing the device shown diagrammatically in the figure of the attached drawing.

DETAILED DESCRIPTION

This device combines a hydrogenation and hydrolysis reactor 1 and two catalytic oxidation reactors 2a and 2b, the said catalytic oxidation reactors being mounted in parallel and each containing a bed of a catalyst for oxidizing $H_2S$ to sulphur. The reactor 1 has, on the one hand, a delivery conduit 3 for the residual gas to be treated, originating from a sulphur plant or from a treatment unit, for example a Sulfreen unit, producing a residual gas of comparable composition, into which are inserted: the cold circuit of an indirect heat exchanger 4 of the gas/gas exchanger type, and then a burner 5 provided with a delivery pipe 6 for a fuel gas and an air delivery pipe 7 and, on the other hand, a discharge conduit 8 for the gases. The said conduit 8 is connected, via the hot circuit of the indirect heat exchanger 4, to the entry 9a of an indirect heat exchanger 10.

The catalytic oxidation reactors 2a and 2b are provided with a first conduit, 11a and 11b respectively, and with a second conduit, 12a and 12b respectively, which are situated on either side of the catalyst bed present in each of the said reactors. The conduit 11a of the reactor 2a is connected, on the one hand, via a conduit 13a provided with a valve 14a, to a conduit 15 fitted at the exit 9b of the heat exchanger 10 and, on the other hand, via a conduit 16a provided with a valve 17a, to a conduit 18, itself connected to the suction orifice of a blower 19 and in which a sulphur condenser 20 is fitted. Similarly, the conduit 11b of the reactor 2b is connected, on the one hand, via a conduit 13b provided with a valve 14b, to the conduit 15, downstream of the junction of the conduit 13a and the said conduit 15 and, on the other hand, via a conduit 16b provided with a valve 17b, to the conduit 18 at a point of the latter which is situated between the conduit 16a and the sulphur condenser 20. Upstream of its connection to the conduit 13a, conduit 15 carries as a bypass a pipe 21 for adding a gas containing free oxygen.

The conduit 12a of the reactor 2a is connected, on the one hand, via a conduit 22a provided with a valve 23a to a conduit 24 for discharging the purified residual gas towards a combustion reactor, not shown, and from there to the atmosphere and, on the other hand, via a conduit 25a provided with a valve 26a to a conduit 27 extending the delivery orifice of the blower 19. The conduit 27 carries a heater 28 and a bypass 29 which is provided with a valve 30 and which short-circuits the heater, and it also comprises a valve 31 situated between the heater and the part of the bypass 29 upstream of the latter. Similarly, the conduit 12b of reactor 2b is connected, via a conduit 22b provided with a valve 23b to the conduit 24 for discharging the purified residual gas and, on the other hand, via a conduit 25b provided with a valve 26b, to the conduit 27, at a point of the latter situated between the bypass 29 and the conduit 25a. A conduit 32 provided with a variable-flow valve 33 is fitted as a bypass on the conduit 18, between the sulphur condenser 20 and the blower 19, and forms a delivery conduit for extra gas, while a conduit 34 provided with a variable-flow valve 35 is fitted as a bypass on the conduit 27 between the blower 19 and the connection of the bypass 29 to the conduit 27 upstream of the valve 31 and forms a purge conduit. Each of the catalytic reactors 2a and 2b is equipped with a system for maintaining the temperature of the catalyst bed, it being possible for the said system to be of any known type, as indicated earlier, and to consist, for example, in the present case, of a coil, 36a and 36b respectively, which is arranged within the catalyst bed present in the reactor in question and through which flows a fluid at an appropriate temperature to obtain the required effect, namely cooling or heating.

The progress of the process in this device can be outlined as follows:

It is assumed that the reactor 2a is in a catalytic oxidation stage while the reactor 2b is in a regeneration stage, the valves 14a, 17b, 23a, 26b and 31 being open while the valves 14b, 17a, 23b, 26a and 30 are closed.

The residual gas arriving from the sulphur plant via the conduit 3 enters the heat exchanger 4 and then passes through the burner 5 in which it is mixed with the combustion gases produced by this burner, which carries out a combustion of a fuel gas by means of air, operating below stoichiometry, to supply an appropriate quantity of $H_2$ and of CO, in addition to heat. As it passes through the burner 5 the residual gas is heated by the combustion gases to the temperature needed for the hydrogenation, for example 200° C. to 400° C., and at the same time it also receives the hydrogen and CO produced during the combustion. The hot mixture of the residual gas and of the combustion gases leaving the burner 5 enters the hydrogenation and hydrolysis reactor 1 containing an appropriate quantity of a catalyst capable of promoting the hydrogenation of $SO_2$ and of elemental sulphur to $H_2S$ and the hydrolysis of the compounds COS and $CS_2$, the said catalyst being, for example, based on cobalt and molybdenum. In the reactor 1 the sulphur compounds other than $H_2S$, which are present in the residual gas, are converted virtually completely into $H_2S$. The gaseous effluent leaving the reactor 1 via the conduit 8, the temperature of which is of the order of 280° C. to 450° C., next enters the heat exchanger 4, where it heats the residual gas flowing in the conduit 3, and then the exchanger 10 to obtain, on leaving the exchanger 10 a cooled gaseous effluent which is at a temperature in the range $\theta$ to 180° C. and especially of approximately 80°–100° C. the said effluent being delivered, via the conduit 15, to the oxidation reactor 2a via the conduit 13a, through the valve 14a and the conduit 11a, after having received, via the conduit 21, a controlled quantity of gas containing free oxygen and especially air for carrying out the oxidation of $H_2S$ to sulphur.

In the reactor 2a which, just like the reactor 2b, contains a catalyst for oxidizing. $H_2S$ to sulphur and, for example, a catalyst as described above, $H_2S$ is selectively oxidized to sulphur by the oxygen in contact with the oxidation catalyst according to the reaction $H_2S + \frac{1}{2} O_2 \rightarrow S + H_2O$.

At the temperatures employed for implementing the oxidation and which are maintained between $\theta$ and 180° C. and advantageously in the range 80° C. to 140° C. and more especially in the range 90° C. to 120° C. the sulphur formed by the oxidation of $H_2S$ is deposited on the said catalyst. A purified residual gas with an extremely low content of residual $H_2S$ leaves the reactor via the conduit 12a and is directed via the conduit 22a, through the valve 23a, into the discharge conduit 24 conveying the said purified residual gas towards a reactor for thermal or catalytic burning, not shown.

A stream of nonoxidizing purging gas is injected by the blower 19 into the conduit 27 through the valve 31 and the heater 28, in which this gas stream is heated to the appropriate temperature for regeneration. The heated gas stream travelling in the conduit 27 is introduced into the reactor 2b via the conduit 25b, through the valve 26b and the conduit 12b, and purges the sulphur-laden oxidation catalyst present in the said reactor. The stream of purging gas entraining the vaporized sulphur leaves the reactor 2b via the conduit 11b and flows via the conduit 16b, through the valve 17b and the conduit 18 as far as the sulphur condenser 20, in which most of the sulphur is separated off by condensation. On leaving the condenser 20 the stream of purging gas is picked up again by the blower 19, to be delivered back into the conduit 27, as indicated above.

After a sufficient period of purging of the catalyst present in the reactor 2b with the purging gas passing through the heater 28 to remove completely the sulphur deposited on the catalyst, the valve 30 is opened and the valve 31 is closed so as to short-circuit the heater 28 and to lower the temperature of the purging gas, and purging is continued for an appropriate period while a fluid at an appropriate temperature is at the same time circulated, if need be, in the system 36b to cool the regenerated catalyst present in the reactor 2b.

When the said catalyst has been cooled to a suitable temperature, allowing the catalyst to be brought into contact with the stream flowing in the circuit 15 downstream of the pipe 21, the parts played by the reactors 2a and 2b are switched round, that is to say that the reactor 2b is brought into an oxidation reaction stage and the reactor 2a into a regeneration/cooling stage, by closing the valves 14a, 17b, 23a, 26b and 30 and by opening the valves 14b, 17a, 23b, 26a and 31, and then to the cooling stage by closing the valve 31 and by opening the valve 30. During the intermediate period of switching of the part played by the catalytic oxidation reactors 2a and 2b the purging gas is circulated in a conduit which is not shown, bypassing these reactors.

According to an implementation of the process according to the invention, the conduit 32 may be connected to the conduit 8, between the hydrogenation and hydrolysis reactor 1 and the heat exchanger 10, or to the conduit 15, between the heat exchanger 10 and the pipe 21 for adding gas containing free oxygen, so as to introduce continuously into the regeneration gas circuit a fraction of the gaseous effluent containing $H_2S$ which originates from the hydrogenation and hydrolysis rector 1 and to which the gas containing free oxygen has not yet been added, and a fraction of the purging gas used for regeneration is removed continuously via the conduit 34 so that the fraction of gaseous effluent containing $H_2S$ and the fraction of purging gas are substantially equal in volume. In this embodiment the conduit 34 is preferably connected to the delivery conduit 3 for the residual gas to be treated, advantageously upstream of the burner 5 and in particular upstream of the heat exchanger 4, so as to recycle the said fraction of purging gas into the residual gas to be treated delivered to the combined hydrogenation and hydrolysis treatment.

An example of implementation of the process according to the invention is given below, to supplement the above description, no limitation being implied.

EXAMPLE

A residual gas originating from a Claus sulphur plant, in which the controlled oxidation, with air, of a sour gas consisting, by volume, of 70% of $H_2S$, 25.4% of $CO_2$, 4% of water and 0.6% of hydrocarbons was performed, was processed by making use of a device similar to that shown diagrammatically in the figure of the attached drawing and operating as described above.

The residual gas treated had the following composition, expressed as molar percentages:

$H_2S$: 0.79

$SO_2$: 0.40

S (vapour): 0.07

$CO_2$: 10.60

$H_2O$: 30.90

$N_2$: 54.20

$H_2$: 2.20

CO: 0.78

COS: 0.03

$CS_2$: 0.03

The residual gas arriving via the conduit 3 at a flow rate of 922 kmoles/hour and a temperature of approximately 132° C. was heated to approximately 280° C. after passing through the indirect heat exchanger 4 and the burner 5 and entered at this temperature the hydrogenation and hydrolysis reactor 1 containing a catalyst of the cobalt/molybdenum type on alumina support.

The conversion of $SO_2$, S, COS and $CS_2$ to $H_2S$ in the reactor 1 was practically complete and the gaseous effluent leaving the said reactor 1 was at a temperature of 305° C. and contained only $H_2S$ as sulphur compound. This gaseous effluent, whose flow rate was 940 kmoles/hour, was cooled to 90° C. by passing through the heat exchanger 4 and through the heat exchanger 10 and then had 44 kmoles/hour of ambient air added to it via the pipe 21, and the mixture obtained entered the reactor 2a in an oxidation reaction stage at a temperature substantially equal to 90° C.

The catalyst employed in the oxidation reactors 2a and 2b consisted of an alumina with nickel, containing 4% of nickel by weight, the said catalyst being obtained by impregnating an activated alumina with the aid of the appropriate quantity of nickel acetate in aqueous solution, then drying the impregnated alumina at 100° C. and finally calcining the dried product for 3 hours at 300° C. This catalyst had a pore volume, determined by the mercury penetration method, of 410 $cm^3$ per liter of catalyst.

The contact time of the gaseous mixture flowing in the oxidation reactor 2a with the layer of oxidation catalyst was 10 seconds. The conversion of $H_2S$ to sulphur in the oxidation reactor was 98%. A gas stream at a temperature of approximately 110° C. and containing 250 vpm of $H_2S$ was removed at the exit of the reactor 2a, the said gas stream being conveyed towards a burner before being discharged to the atmosphere.

The purging gas injected into the reactor 2b for the purpose of regenerating the sulphur-laden oxidation catalyst consisted of nitrogen and was delivered by the blower 19 at a flow rate of 12,000 $Sm^3/h$. The said purging gas was heated to a temperature of between 300° and 350° C. by the heater 28 before being introduced into the reactor 2b in a regeneration stage. During the stage of cooling of the regenerated catalyst the heater 28 was bypassed and after the temperature of the purging gas had been lowered to approximately 125° C. a fluid at a temperature of 80° C. was circulated in the coil 36b while the purging was continued.

The reactors 2a and 2b operated alternately for 30 hours in a purification stage, that is to say in a reaction stage, and for 30 hours, including 10 hours cooling, in a regeneration/cooling stage.

The sulphur plant incorporating the process according to the invention for treating the residual gases produced by the said plant had an overall sulphur yield of 99.9% over a period of several months.

We claim:

1. A process for the removal of sulphur compounds from a residual gas with recovery of said compounds in the form of sulphur, which process comprises subjecting the residual gas to a combined hydrogenation and hydrolysis to convert the sulphur compounds which it contains to $H_2S$, recovering a gaseous effluent containing $H_2S$ as the sole sulphur compound and water vapor, cooling the gaseous effluent to a temperature between the dew point θ of the water in said gaseous effluent and 180° C., wherein the water vapor is not condensed, mixing the gaseous effluent with a gas containing free oxygen to provide an $O_2$:$H_2S$ molar ratio between 0.5 and 3.0, contacting the cooled gaseous effluent and the gas containing free oxygen with a catalyst for selective oxidation of $H_2S$ to sulphur at a temperature between θ and 180° C., depositing virtually all of the sulphur formed on the catalyst and obtaining a purified gas stream substantially free of $H_2S$.

2. The process according to claim 1, wherein the contact time of the gaseous reaction mixture consisting of the gaseous effluent containing $H_2S$ and of the gas containing free oxygen, with the oxidation catalyst, has a value ranging from 0.5 of a second to 20 seconds.

3. The process of claim 2, wherein said contact time has a value ranging from 1 second to 15 seconds.

4. The process according to claim 2, wherein the oxidation catalyst consists of an active phase consisting of one or more oxides and/or salts of transition metals chosen from nickel, cobalt, iron, copper, silver, manganese, molybdenum, chromium, tungsten and vanadium, which is deposited on a support chosen from bauxite, alumina, titanium oxide, zirconium oxide, zeolites, silica/alumina mixtures, silica/titanium oxide mixtures, silica and active carbon, the catalyst having a pore volume, determined by the mercury penetration method, representing 150 $cm^3$ to 600 $cm^3$ per liter of catalyst.

5. The process according to claim 4, wherein the gaseous effluent containing $H_2S$, originating from the combined hydrogenation and hydrolysis treatment, is cooled to 80°–100° C. before being brought into contact with the oxidation catalyst with the gas containing free oxygen.

6. The process according to claim 5, wherein the active phase of the oxidation catalyst, calculated as weight of metal, represents 0.1 to 15% of the weight of the catalyst.

7. The process of claim 6, wherein the active phase of the oxidation catalyst, calculated as weight of metal, represents 0.2 to 7% of the weight of the catalyst.

8. The process according to claim 6, wherein the sulphur-laden oxidation catalyst is subjected at regular intervals to a regeneration by purging with the aid of a nonoxidizing gas, the operation being performed at temperatures of between 200° C. and 500° C., to vaporize the sulphur retained on the catalyst, and the regenerated catalyst is then cooled to a temperature of between θ and 180° C. for a new application of the oxidation reaction, this cooling being carried out by means of an inert gas.

9. The process according to claim 8, wherein the coolant gas contains water vapour at least during the final stage of cooling of the regenerated catalyst.

10. The process according to claim 8, wherein a fraction of the gaseous effluent containing $H_2S$, which originates from the combined hydrogenation and hydrolysis treatment applied to the residual gas and has not yet been brought into contact with the gas containing free oxygen is introduced continuously into the regeneration gas circuit, and in that a fraction of the purging gas used for the regeneration is removed continuously, the fractions being substantially equal in volume.

11. The process of claim 8, wherein said regeneration is performed at a temperature between 250° C. and 450° C.

12. The process according to claim 8, wherein the contact of the gaseous effluent containing $H_2S$ and of the gas containing free oxygen with the oxidation catalyst is brought about at temperatures maintained in the range 80° C. to 140° C.

13. The process of claim 12, wherein the temperature is in the range of 90° C. to 120° C.

14. The process according to claim 12, wherein the maintaining of the temperature for bringing the gaseous effluent containing $H_2S$ and the gas containing free oxygen into contact with the oxidation catalyst is carried out by employing a fluid circulating in indirect heat exchange with the catalyst.

15. The process according to claim 14, wherein a fraction of the gaseous effluent containing $H_2S$, which originates from the combined hydrogenation and hydrolysis treatment applied to the residual gas and has not yet been brought into contact with the gas containing free oxygen is introduced continuously into the regeneration gas circuit, and in that a fraction of the purging gas used for the regeneration is removed continuously, the fractions being substantially equal in volume.

16. The process according to claim 15, wherein the fraction of purging gas which is removed is injected continuously into the residual gas to be treated, delivered to the combined hydrogenation and hydrolysis treatment.

17. The process according to claim 16, wherein the residual gas to be treated is selected from the group consisting of a residual gas from a Claus sulphur plant and a residual gas from a purification unit treating a sulphur plant residual gas by making use of the Claus reaction.

18. The process according to claim 1, wherein the oxidation catalyst consists of an active phase consisting of one or more oxides and/or salts of transition metals chosen from nickel, cobalt, iron, copper, silver, manganese, molybdenum, chromium, tungsten and vanadium, which is deposited on a support chosen from bauxite, alumina, titanium oxide, zirconium oxide, zeolites, silica/alumina mixtures, silica/titanium oxide mixtures, silica and active carbon, the catalyst having a pore volume, determined by the mercury penetration method, representing 150 $cm^3$ to 600 $cm^3$ per liter of catalyst.

19. The process according to claim 1, wherein the gaseous effluent containing $H_2S$, originating from the combined hydrogenation and hydrolysis treatment, is cooled to 80°–100° C. before being brought into contact with the oxidation catalyst with the gas containing free oxygen.

20. The process according to claim 1, wherein the active phase of the oxidation catalyst, calculated as weight of metal, represents 0.1 to 15% of the weight of the catalyst.

21. The process of claim 20, wherein the active phase of the oxidation catalyst, calculated as weight of metal, represents 0.2 to 7% of the weight of the catalyst.

22. The process according to claim 1, wherein the sulphur-laden oxidation catalyst is subjected at regular intervals to a regeneration by purging with the aid of a nonoxidizing gas, the operation being performed at temperatures of between 200° C. and 500° C., to vaporize the sulphur retained on the catalyst, and the regenerated catalyst is then cooled to a temperature of between θ to 180° C. for a new application of the oxidation reaction, this cooling being carried out by means of an inert gas.

23. The process of claim 22, wherein said regeneration is performed at a temperature between 250° C. and 450° C.

24. The process according to claim 1, wherein the contact of the gaseous effluent containing $H_2S$ and of the gas containing free oxygen with the oxidation catalyst is brought about at temperatures maintained in the range of 80° C. to 140° C.

25. The process of claim 24, wherein the temperature is in the range of 90° C. to 120° C.

26. The process according to claim 1, wherein the maintaining of the temperature for bringing the gaseous effluent containing $H_2S$ and the gas containing free oxygen into contact with the oxidation catalyst is carried out by employing a fluid circulating in indirect heat exchange with the catalyst.

27. The process according to claim 1, wherein the residual gas to be treated is selected from the group consisting of a residual gas from a Claus sulphur plant and a residual gas from a purification unit treating a sulphur plant residual gas by making use of the Claus reaction.

28. The process of claim 1, wherein said $O_2$:$H_2S$ molar ratio ranges from 0.5 to 1.5.

29. A process for the removal of sulphur compounds from a residual gas which process comprises after treatment of the residual gas by a combined hydrogenation and hydrolysis to convert the sulphur compounds which it contains as $H_2S$, cooling the effluent to a temperature in the range of between the dew point θ of the water in the effluent and 180° C., and avoiding condensing its water vapor, contacting the effluent containing the water vapor mixed with a gas containing free oxygen with a catalyst for selective $H_2S$ oxidation to sulphur at a temperature between θ and 180° C., depositing virtually all of the sulphur formed on the catalyst and obtaining a purified gas stream substantially free of $H_2S$.

30. The process of claim 29 wherein in the step of the catalytic oxidation of $H_2S$ to sulphur there is used an excess of oxygen relative to the stoichiometric amount in accordance with the reaction $H_2S+½ O_2=H_2O+S$.

31. The process of claim 29 which comprises regenerating the deposited sulphur from the sulphur laden catalyst by periodically stripping the catalyst with a non-oxidizing gas, essentially free of water, thereby vaporizing the sulphur from the catalyst.

32. The process of claim 31, which comprise cooling the catalyst to a temperature between θ and 180° C. with an inert gas prior to being subjected again to the exposure of the effluent and the gas containing free oxygen for selective oxidation of the $H_2S$ to sulphur.

33. The process of claim 29, wherein the oxidation catalyst consists of an active phase consisting of one or more oxides and/or salts of transition metals chosen from nickel, cobalt, iron, copper, silver, manganese, molybdenum, chromium, tungsten and vanadium, which is deposited on a support chosen from bauxite, alumina, titanium oxide, zirconium oxide, zeolites, silica/alumina mixtures, silica/titanium oxide mixtures, silica and active carbon, the catalyst having a pore volume, determined by the mercury penetration method, representing 150 $cm^3$ to 600 $cm^3$ per liter of catalyst.

34. The process of claim 29, wherein the gaseous effluent containing $H_2S$, originating from the combined hydrogenation and hydrolysis treatment, is cooled to 80°–100° C. before being brought into contact with the oxidation catalyst with the gas containing free oxygen.

35. The process of claim 29, wherein the active phase of the oxidation catalyst, calculated as weight of metal, represents 0.1 to 15% of the weight of the catalyst.

36. The process of claim 35, wherein the active phase of the oxidation catalyst, calculated as weight of metal, represents 0.2 to 7% of the weight of the catalyst.

37. The process of claim 29, wherein the contact of the gaseous effluent containing $H_2S$ and of the gas containing free oxygen with the oxidation catalyst is brought about at temperatures maintained in the range of 80° C. to 140° C.

38. The process of claim 36 wherein the temperature is in the range of 90° C. to 120° C.

39. The process of claim 29, wherein the residual gas to be treated is selected from the group consisting of a residual gas from a Claus sulphur plant and a residual gas from a purification unit treating a sulphur plant residual gas by making use of the Claus reaction.

40. The process of claim 29 wherein the sulphur-laden oxidation catalyst is subjected at regular intervals to a regeneration by purging with the aid of a nonoxidizing gas, the operation being performed at temperatures of between 200° C. and 500° C., to vaporize the sulphur retained on the catalyst, and the regenerated catalyst is then cooled to a temperature of between θ to 180° C. for a new application of the oxidation reaction, this cooling being carried out by means of an inert gas.

41. The process of claim 40 wherein said regeneration is performed at a temperature between 250° C. and 450° C.

* * * * *